March 14, 1939.  A. A. JOHNSON  2,150,624
TRUCK BODY
Filed April 14, 1937  3 Sheets-Sheet 1
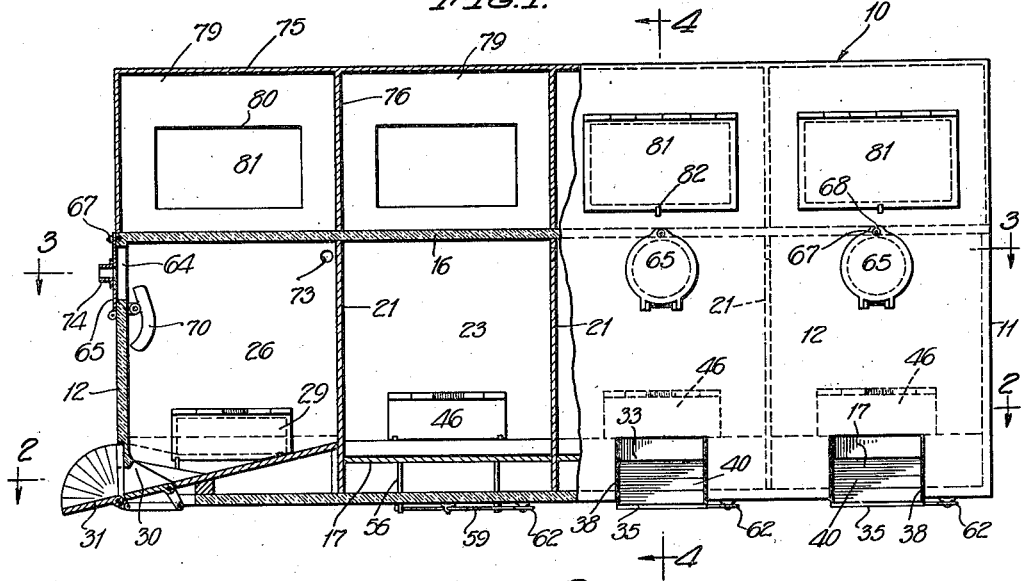
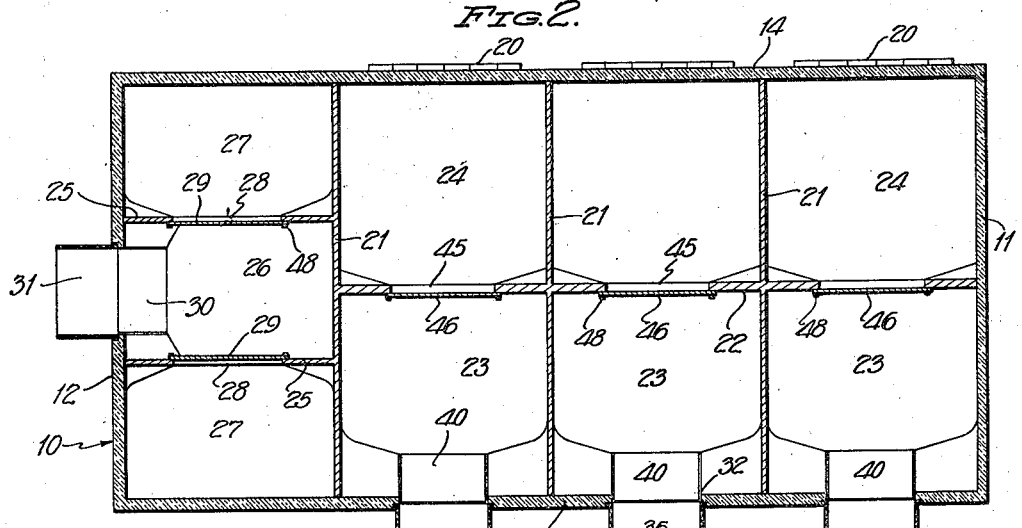
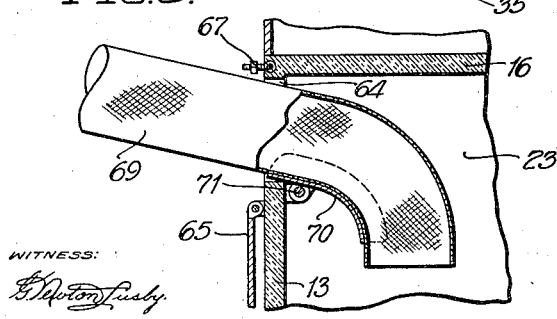
ALBERT A. JOHNSON.
INVENTOR.
BY Ely & Pattison.
ATTORNEYS.

March 14, 1939.  A. A. JOHNSON  2,150,624
TRUCK BODY
Filed April 14, 1937   3 Sheets-Sheet 2
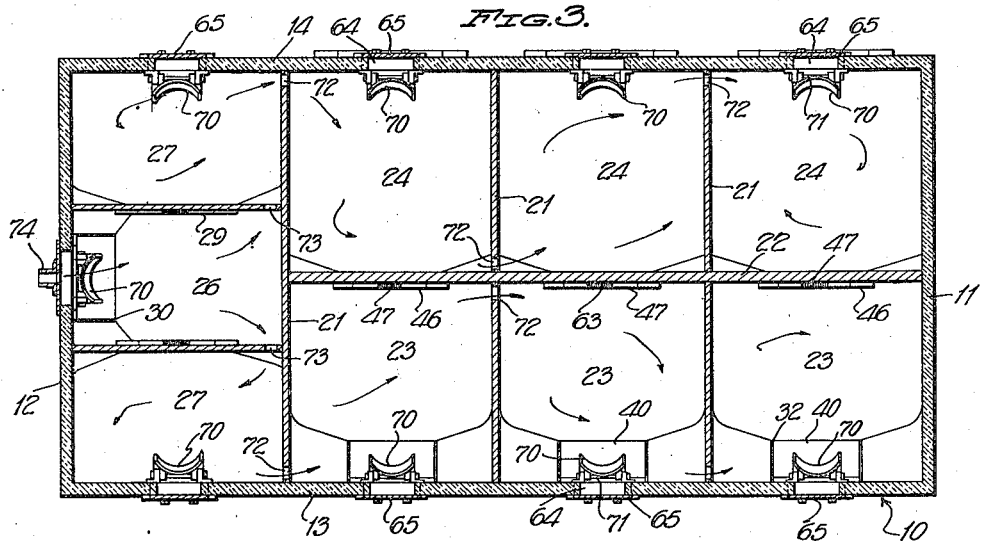
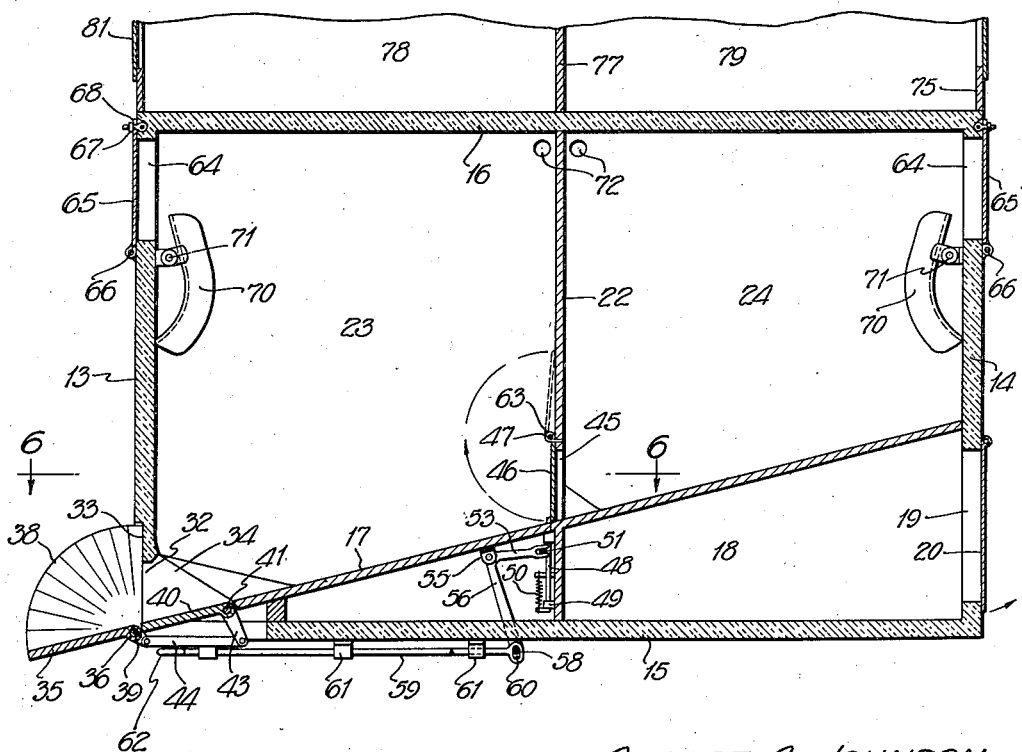
ALBERT A. JOHNSON.
INVENTOR.
BY Ely & Pattison.
ATTORNEYS March 14, 1939.  A. A. JOHNSON  2,150,624
TRUCK BODY
Filed April 14, 1937   3 Sheets-Sheet 3
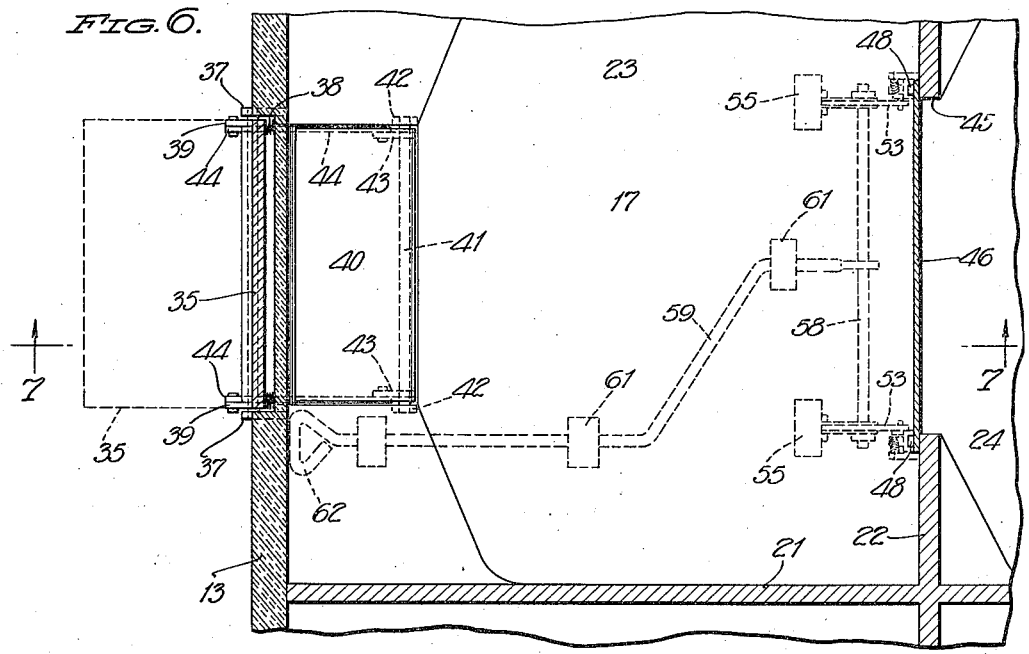
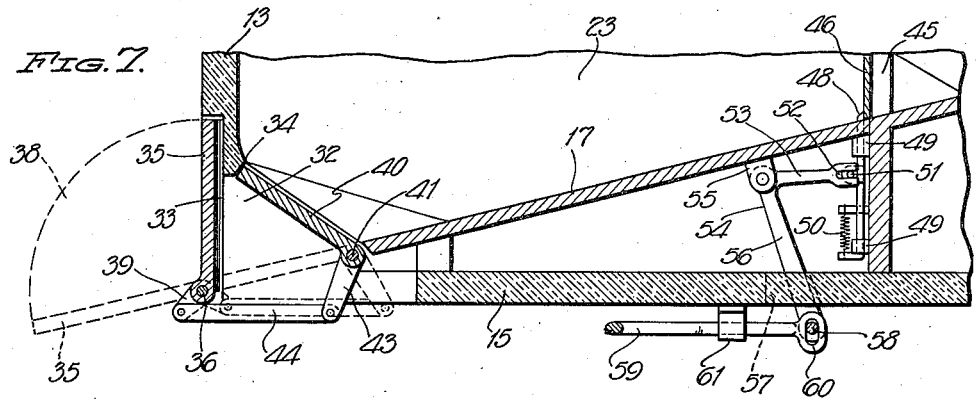
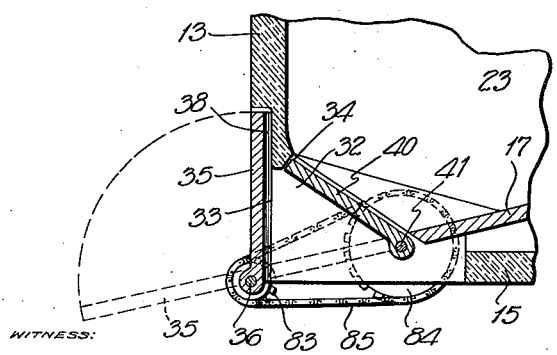
ALBERT A. JOHNSON.
INVENTOR.
BY *Ely + Pattison*
ATTORNEYS.

Patented Mar. 14, 1939

2,150,624

UNITED STATES PATENT OFFICE 2,150,624

TRUCK BODY

Albert A. Johnson, Kew Gardens, N. Y.

Application April 14, 1937, Serial No. 136,707

4 Claims. (Cl. 298—24)

This invention relates to improvements in truck bodies and more particularly to refrigerator trucks for the transporting and unloading of citrus fruits.

In my copending patent application, Serial No. 136,257, filed April 12, 1937, I have disclosed apparatus for the shipment of carload lots of citrus fruits in loose bulk condition from the geographical location of the source of growth of the fruit to its distant point of distribution for consumption purposes. It is therefore the purpose of this invention to provide a truck body for receiving the fruit at the car unloading station for expeditious delivery to wholesalers, retailers, hotels, or institutions using truck-loads or partial truck loads of fruit. The truck body may also be used on motor trucks for short haulage of fruit from its source of growth to neighboring communities, in which instance it might prove more convenient to ship the fruit by motor truck rather than by railway car.

Another feature of the invention resides in a truck body having separate compartments for receiving predetermined amounts of fruit for delivery to a number of customers along a delivery route, there being a novel means of emptying the contents of the compartment through the curb side of the truck body.

A further feature of the invention is the provision of a dump truck body for the delivery of loose citrus fruit whereby the flow of fruit through the discharge outlet may be stopped against the pressure of the load without crushing or injuring the fruit during movement of the outlet closure to a closing position.

A further feature of the invention is to provide a truck body having separate transversely disposed side by side compartments for the storage of separate predetermined lots of citrus fruit with a common discharge outlet for the side by side compartments, and a novel mechanism for successively releasing the loads of the compartments through the common outlet.

A still further object of the invention resides in a multi-compartment truck body provided with means by which the separate compartments may be cooled and ventilated to maintain the load of citrus fruit therein in fresh condition.

With these and other objects in view, the invention resides in the certain novel construction, combination and arrangement of parts, the essential features of which are hereinafter fully described in the following specification, are particularly pointed out in the appended claims, and are illustrated in the accompanying drawings, in which:

Figure 1 is a sectional side elevational view of my multi-compartment truck body.

Figure 2 is a horizontal sectional view on the line 2—2 of Figure 1.

Figure 3 is a horizontal sectional view on the line 3—3 of Figure 1.

Figure 4 is a fragmentary vertical sectional view on the line 4—4 of Figure 1.

Figure 5 is a detail vertical sectional view showing a filling tube extending through one of the compartment filling openings.

Figure 6 is an enlarged detail horizontal view on the line 6—6 of Figure 4.

Figure 7 is a vertical sectional view on the line 7—7 of Figure 6.

Figure 8 is a detail vertical sectional view showing a modified form of closure actuating means.

Whereas I have specifically mentioned that my improved truck body is especially adapted for use in the delivery of citrus fruits such as oranges, grape fruit, and lemons, I wish it to be understood that other loose articles may be transported for delivery if so desired. Furthermore, the truck body may be permanently attached to an automobile truck chassis, or may be used in the manner of the present pick up bodies which are detachable from the chassis to eliminate loss of time during loading and unloading.

Referring to the drawings by reference characters, the numeral 10 designates an enclosed rectangular shaped body which includes an insulated front wall 11, an insulated rear wall 12 and opposed insulated side walls 13 and 14 respectively, an insulated bottom wall 15 and an insulated top wall 16. Overlying the bottom wall 15 and supported in spaced relation with respect thereto, is an inclined floor 17, the said floor being inclined from the wall 13 toward the wall 14. The space 18 between the insulated bottom wall 15 and the inclined flooring 17 may be used for storage purposes and access thereto is had through a door opening 19 provided in the wall 14 and normally closed by a hinged door 20. The space 18 may be divided by transverse partitions to divide the same into a number of separate compartments, each having a door opening 19 and a hinged door 20.

Rising upwardly from the inclined floor 17 and extending through the top wall 16 are equidistantly spaced transverse partitions 21, three of which have been shown in the drawings. Extending from the front wall 11 to the rearmost partition 21 is a central longitudinal partition 22, the same extending from the flooring 17 to the top wall 16 and which divides the interior of the body into three sets of transversely disposed side by side storage compartments or bins 23 and 24. The space between the rearmost transverse partition 21 and rear wall 12 is divided by two spaced longitudinal partitions 25—25 into a center compartment 26 and a pair of side compartments 27—27. The compartments 27—27 communicate with the compartment 26 through door openings 28 and the bottom walls of the compartments 27—27 are inclined outwardly away from the openings 28 in order that the contents of the compartments 27 will gravitate therefrom into the compartment 26 when the latter is empty and when the doors 29 closing the openings 28 are in open position. The rear wall 12 is provided with a discharge opening 30 which is normally closed by door closure means 31 which will be described hereinafter. The doors 29 are held closed by releasable latch mechanism also to be described hereinafter.

In view of the fact that each pair of side by side compartments 23 and 24 are identical and are associated with the same loading and unloading mechanism, a description of one pair will suffice for the others.

The side wall 13 which is the curb side of the truck body is provided with a discharge outlet 32, the same being disposed at the low end of the inclined flooring 17. The discharge outlet 32 is provided with a vertical outer door way 33 and an inner door way 34, the latter being disposed at an angle with respect to the door way 33 as clearly indicated in Figure 4 of the drawings. An outer door 35 is fixed to a shaft 36, the latter being rotatably mounted in bearings 37 carried by the side wall 13. Fixed to opposite sides of the door 35 are collapsible end walls 38, the same folding up when the door 35 is in closed position and acting to confine the flow of articles over the door 35 when the latter is in open position. Fixed to the shaft 36 at opposite ends, are relatively short lever arms 39.

For closing the door way 34, there is provided an inner door 40 the same being fixed to a shaft 41 having its ends journaled in bearings 42 fixed to the floor 17. Also fixed to the shaft 41 at the ends of the door 40 are lever arms 43 of a length greater than the lever arms 39. Pivoted to the lever arms 39 and 43 are connecting links 44 whereby the doors 35 and 40 are operatively connected together for simultaneous movement to open and closed positions. The leverage connection between the doors is such that the outer door 35 when manually operated serves to impart a slower turning movement to the door 40 for a purpose to be hereinafter explained.

The central longitudinal partition 22 between each pair of compartments 23 and 24 is provided with a door opening 45, the latter extending upwardly from the floor 17. A door 46 is hinged at its top at 47 for swinging movement inwardly within the compartment 23 in order that a load within the compartment 24 may gravitate without interference through the opening 45 into the compartment 23.

For securing the door 46 closed against the weight of a load contained in the compartment 24, there is provided a pair of latch bolts 48 mounted in bearings 49 and which pass upwardly through the flooring 17 and are respectively disposed at opposite sides of the door opening 45 and clear the same so that when the bolts are extended, they are disposed in the path of the movement of the hinged door 46 to open position. Springs 50 place a tension upon the latch bolts 48 to move the same to extended position and extending from the latch bolts are pins 51 which are received in the slotted ends 52 of the arms 53 of bell crank levers 54, the said levers being pivoted in brackets 55 carried by the underside of the floor 17. The arms 56 of the bell crank levers 54 extend through slots 57 in the bottom wall 15 and the said arms 56 are connected by a rod 58. Connected to the rod 58 approximately centrally of its length is an actuating rod 59, the inner end being provided with an elongated slot 60 for the passage of the rod 58. The actuating rod 59 is mounted in bearings 61 fixed to the under side of the bottom wall 15 and which actuating rod extends transversely of the bottom wall and terminates in an actuating handle 62 disposed adjacent the discharge opening 32 in order to be accessible to an operator standing adjacent the discharge opening. It will be seen that an operator by exerting a pull upon the handle 62 will actuate the rod 59 causing a pull upon the rod 58 which rocks the bell crank levers 54 causing downward movement of the arms 53 of the said bell crank levers and imparts a corresponding downward movement to the latch bolts 48 against the action of the springs 50. As the upper ends of the latch bolts clear the lower edge of the door 46, the spring 63 of the hinge 47 swings the door 46 to an open position as shown in dotted lines in Figure 4 of the drawings. The door 46 is adapted to be manually moved to closed position and will ride over the beveled extending ends of the latch bolts and thus again become locked by the said bolts against swinging movement to open position.

While I have specifically described the latch mechanism for the doors 46, it will be understood that similar mechanism is employed in connection with the doors 29. Also, the discharge outlet 31 at the rear of the body is identical to and is closed by a double acting door similar to the doors 35 and 40 employed for closing the discharge outlets 32.

Each compartment 23, 24, 26, and 27 is provided in an outer insulated wall with a filling opening 64, each opening being closed by a door 65 hinged at its bottom at 66 so as to drop downwardly to an open position and the said door is held closed by bolt and nut means 67, the bolt of said means passing through a slot 68 in the top of the door 65. In Figure 5 of the drawings, a door 65 is shown in an open position with a flexible filling tube 69 extending therethrough into one of the compartments 23. In order to prevent undue kinking of the flexible filling tube, there is provided a saddle-like rest 70 pivoted at 71 adjacent the bottom of the filling opening 64 at the inside of the wall in which the opening 64 is formed.

The transverse partitions 21 are provided at opposite sides adjacent the top with ventilating openings 72, the same being staggered in order to create a circulation of air through the compartments 23 and 24. Similar openings 73 are provided in the partitions 25 for it is into the compartment 26 that cool air may be pumped by connecting a hose to the connection 74 provided at the top of the rear wall 12. After the truck body has been loaded, the compartment may be charged with cool air, it being understood that all doors at the outside of the compartment are closed in order to retain the cool air within the truck body.

Supported by the insulated truck body is an enclosed superstructure 75 having transverse partitions 76 and a longitudinal partition 77, the partition 76 being disposed in alinement with the transverse partition 21 thus dividing the superstructure into transversely disposed pairs of storage compartments 78 and 79. The outer wall of each storage compartment 78 and 79 is provided with a door opening 80 normally closed by an upwardly swinging hinged door 81, the same being held closed by a releasable catch 82. The space 18 below the floor 17 and the compartments 78 and 79 may be employed for carrying additional loads other than that placed in the several compartments of the insulated body.

From the foregoing description it will be seen that if a pair of side by side compartments 23 and 24 are filled with articles such as citrus fruits in the form of oranges, grape fruit, or lemons, the load is kept in fresh cool condition by the circulation of air through the compartments, and loading of the same is facilitated by inserting the loading tube 69 through the openings 64. The truck may be loaded at a fruit receiving station, and dispatched for the delivery of predetermined amounts of the loose fruits to stores, hotels, or other institutions purchasing citrus fruits in large quantities. In the unloading of a pair of loading compartments 23 and 24, the compartment 23 is first emptied by an operator grasping the door 35 and swinging the same downwardly to an open position as shown in Figure 4 of the drawings. As the door 35 is manually moved to open position, the inner door 40 is similarly moved, and the doors 35 and 40 serve as a continuation or extension for the lower end of the inclined bottom wall 17 at the discharge outlet 32. The contents of the compartment 23 will gravitate through the discharge outlet 32 into any receptacle placed therebeneath for receiving the articles. Should it be desired to shut off the flow of fruit or other articles through the discharge outlet 32, the door 35 is manually swung upwardly and in so moving, the door 40 also moves upwardly and which latter door acts to hold back the weight of the load within the compartment 23, thus preventing interference of the fruit and injury thereto during the closing of the discharge outlet 32. After the compartment 23 has been partially or entirely empty, the operator may empty the load from the compartment 24 through the compartment 23 by actuating the rod 59, releasing the latches 48 whereupon the doors 46 will swing open and the load from the compartment 24 will gravitate through the door opening 45 and down through the outlet 32.

In Figure 8 of the drawings I have illustrated a slightly modified form of door operating mechanism at the discharge outlet 32 and similar parts hereinbefore referred to are identified by like reference characters. In this form the shafts 36 and 41 on which the doors 35 and 40 respectively are fixed, carry sprockets 83 and 84 respectively, the latter sprocket being larger than the sprocket 83. Encircling each pair of sprockets is an endless chain 85, thus it will be seen that manual movement imparted to the door 35 will be transferred to the door 40 but that the door 40 will move at a less speed than the door 35. This sprocket and chain arrangement constitutes the equivalent of the leverage principle employed for simultaneously operating the doors 35 and 40 heretofore described.

While I have shown and described what I consider to be the most practical embodiments of my invention, I wish it to be understood that such changes and modifications as come within the scope of the appended claims may be resorted to if desired.

Having thus described the invention, what I claim as new and desire to secure by Letters Patent of the United States, is:

1. A storage bin comprising a receptacle body having a discharge outlet, flooring inclined away from said discharge outlet, inner and outer doors hinged at their bottoms at the low end of said flooring and normally closing said discharge outlet, and mechanism operatively connecting said doors to move the same simultaneously in the same direction to a raised closed position or to a lowered open position, the doors when in open position cooperating to form a continuation of the low end of the inclined flooring.

2. A storage bin comprising a receptacle body having a discharge outlet, flooring inclined away from said discharge outlet, inner and outer doors hinged at their bottoms at the low end of said flooring and normally closing said discharge outlet, and mechanism operatively connecting said doors to move said inner door simultaneously with said outer door and in the same direction upon manual actuation of said outer door but at a reduced speed with respect to the movement of said outer door, said doors when in open position cooperating to form a continuation of the low end of the inclined flooring.

3. A storage bin comprising a receptacle body having a discharge outlet, flooring inclined away from said discharge outlet, inner and outer doorways at said discharge outlet, inner and outer doors hinged at their bottoms normally closing the respective inner and outer doorways and acting as successive inclined extensions for the low end of the inclined flooring when the doors are in lowered open position, and mechanism operatively connecting said doors to move the same simultaneously in the same direction but at different rates of speed upon manual actuation of said outer door.

4. A storage bin comprising a receptacle body having a discharge outlet, flooring inclined away from said discharge outlet, inner and outer doorways at said discharge outlet, the outer doorway being vertically disposed while the inner doorway is disposed at an angle relative to said outer doorway, inner and outer hinged doors normally closing the respective inner and outer doorways and acting as successive inclined extensions for the inclined flooring when the doors are in open position, and mechanism operatively connecting said doors to move the same simultaneously in the same direction but at different rates of speed upon manual actuation of said outer door.

ALBERT A. JOHNSON.